(12) United States Patent
Wei

(10) Patent No.: US 12,381,584 B2
(45) Date of Patent: Aug. 5, 2025

(54) RADIO FREQUENCY CIRCUIT AND ELECTRONIC DEVICE

(71) Applicant: VIVO MOBILE COMMUNICATION CO., LTD., Guangdong (CN)

(72) Inventor: Renjie Wei, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 470 days.

(21) Appl. No.: 17/949,329

(22) Filed: Sep. 21, 2022

(65) Prior Publication Data

US 2023/0019092 A1    Jan. 19, 2023

Related U.S. Application Data

(63) Continuation of application No. PCT/CN2021/089547, filed on Apr. 25, 2021.

(30) Foreign Application Priority Data

Apr. 30, 2020  (CN) .......................... 202010362992.8

(51) Int. Cl.
  *H04B 1/00*    (2006.01)
  *H01Q 21/28*   (2006.01)
  *H04B 1/40*    (2015.01)
  *H04B 7/06*    (2006.01)

(52) U.S. Cl.
  CPC ........... *H04B 1/0064* (2013.01); *H01Q 21/28* (2013.01); *H04B 1/40* (2013.01); *H04B 7/0602* (2013.01)

(58) Field of Classification Search
  CPC ........ H01Q 21/28; H01Q 3/24; H04B 1/0064; H04B 1/0458; H04B 1/18; H04B 1/40; H04B 1/401; H04B 7/0602
  See application file for complete search history.

(56) References Cited

U.S. PATENT DOCUMENTS

| | | |
|---|---|---|
| 2011/0250926 A1 | 10/2011 | Wietfeldt et al. |
| 2015/0256272 A1 | 9/2015 | Weissman et al. |
| 2018/0131501 A1* | 5/2018 | Little .................. H04B 1/0064 |
| 2019/0288732 A1 | 9/2019 | Bai |
| 2021/0288676 A1 | 9/2021 | Zhang |

(Continued)

FOREIGN PATENT DOCUMENTS

| | | |
|---|---|---|
| CN | 109274397 A | 1/2019 |
| CN | 109802699 A | 5/2019 |

(Continued)

*Primary Examiner* — Nguyen T Vo
(74) *Attorney, Agent, or Firm* — Price Heneveld LLP

(57) ABSTRACT

The present invention provides a radio frequency circuit and an electronic device. The radio frequency circuit includes a radio frequency transceiver having a first transmit port, a first radio frequency module connected to a first antenna array, a second radio frequency module connected to a second antenna array, and a first switch. A first input terminal of the first switch is connected to the first transmit port, and two output terminals of the first switch are respectively connected to the two radio frequency modules. In a case that the first switch is in a first state, the first transmit port is conductively connected to the first radio frequency module; or in a case that the first switch is in a second state, the first transmit port is conductively connected to the second radio frequency module.

11 Claims, 5 Drawing Sheets

(56) References Cited

U.S. PATENT DOCUMENTS

| | | | |
|---|---|---|---|
| 2021/0336647 A1* | 10/2021 | Yamaguchi | H03F 3/245 |
| 2021/0337054 A1* | 10/2021 | Choi | H01Q 5/20 |
| 2021/0351812 A1 | 11/2021 | Chen et al. | |
| 2022/0014219 A1 | 1/2022 | Hsieh et al. | |
| 2022/0014229 A1 | 1/2022 | Hsieh et al. | |
| 2022/0094055 A1* | 3/2022 | Ramasamy | H01Q 5/307 |
| 2022/0255569 A1* | 8/2022 | Chen | H04B 1/0053 |

FOREIGN PATENT DOCUMENTS

| | | | |
|---|---|---|---|
| CN | 109861734 A | 6/2019 | |
| CN | 109873664 A | 6/2019 | |
| CN | 109951192 A | 6/2019 | |
| CN | 110943757 A | 3/2020 | |
| CN | 111525933 A | 8/2020 | |
| EP | 3540956 A1 | 9/2019 | |
| JP | 2014011515 A | 1/2014 | |
| JP | 2015139005 A | 7/2015 | |
| JP | 2016007009 A | 1/2016 | |
| KR | 20160129074 A | 11/2016 | |

* cited by examiner

RADIO FREQUENCY CIRCUIT AND ELECTRONIC DEVICE

CROSS-REFERENCE TO RELATED APPLICATIONS

This application is a continuation application of International Application No. PCT/CN2021/089547 filed on Apr. 25, 2021, which claims priority to Chinese Patent Application No. 202010362992.8, filed in China on Apr. 30, 2020, which are incorporated herein by reference in their entireties.

TECHNICAL FIELD

The present invention relates to the field of communications technologies, and in particular, to a radio frequency circuit and an electronic device.

BACKGROUND

A 5th generation (5G) mobile communications technology supports two modes in a development process: 1T4R (1-transmit 4-receive) and 2T4R (2-transmit 4-receive). A 5G new radio (New Radio, NR) frequency band supports 1T4R and 2T4R technologies in which sounding reference signals (Sounding Reference Signal, SRS) are transmitted by antennas alternately or transmitted by switching antennas.

In the prior art, when 2T4R is performed in one frequency band (for example, N78), amplifiers corresponding to transmit signals of TX1 and TX2 are fixed, and when TX1 is used for fixed transmission in 1T4R, only a TX1 path can be used, that is, when there is only 2T4R, only a power amplifier (Power Amplifier, PA) corresponding to TX2 works. When four antennas are switched, performance of an antenna is poor due to layout and space reasons, and a loss in radio frequency wiring leads to antenna performance imbalance, making it impossible to switch to an antenna with poor performance. In this case, four-antenna switching cannot be implemented, and only three-antenna switching or even two-antenna switching can be implemented.

SUMMARY

Embodiments of the present invention provide a radio frequency circuit and an electronic device to resolve a problem that an antenna layout and a loss in radio frequency wiring lead to antenna performance imbalance in the prior art.

To resolve the foregoing problem, the embodiments of the present invention are implemented as follows:

According to a first aspect, an embodiment of the present invention provides a radio frequency circuit, including:
 a radio frequency transceiver, including a first transmit port;
 a first radio frequency module, where the first radio frequency module is connected to a first antenna array;
 a second radio frequency module, where the second radio frequency module is connected to a second antenna array; and
 a first switch, where a first input terminal of the first switch is connected to the first transmit port, and two output terminals of the first switch are respectively connected to the first radio frequency module and the second radio frequency module, where in a case that the first switch is in a first state, the first transmit port is conductively connected to the first radio frequency module; or in a case that the first switch is in a second state, the first transmit port is conductively connected to the second radio frequency module.

According to a second aspect, an embodiment of the present invention provides an electronic device, where the electronic device includes the foregoing radio frequency circuit.

In the technical solutions of the present invention, with different antenna layouts, the first transmit port is controlled to conductively connect to different radio frequency modules, and it is possible to select different radio frequency modules to implement antenna switching, reduce a path loss caused by radio frequency wiring, further resolve a problem of antenna performance imbalance, and improve antenna switching performance.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
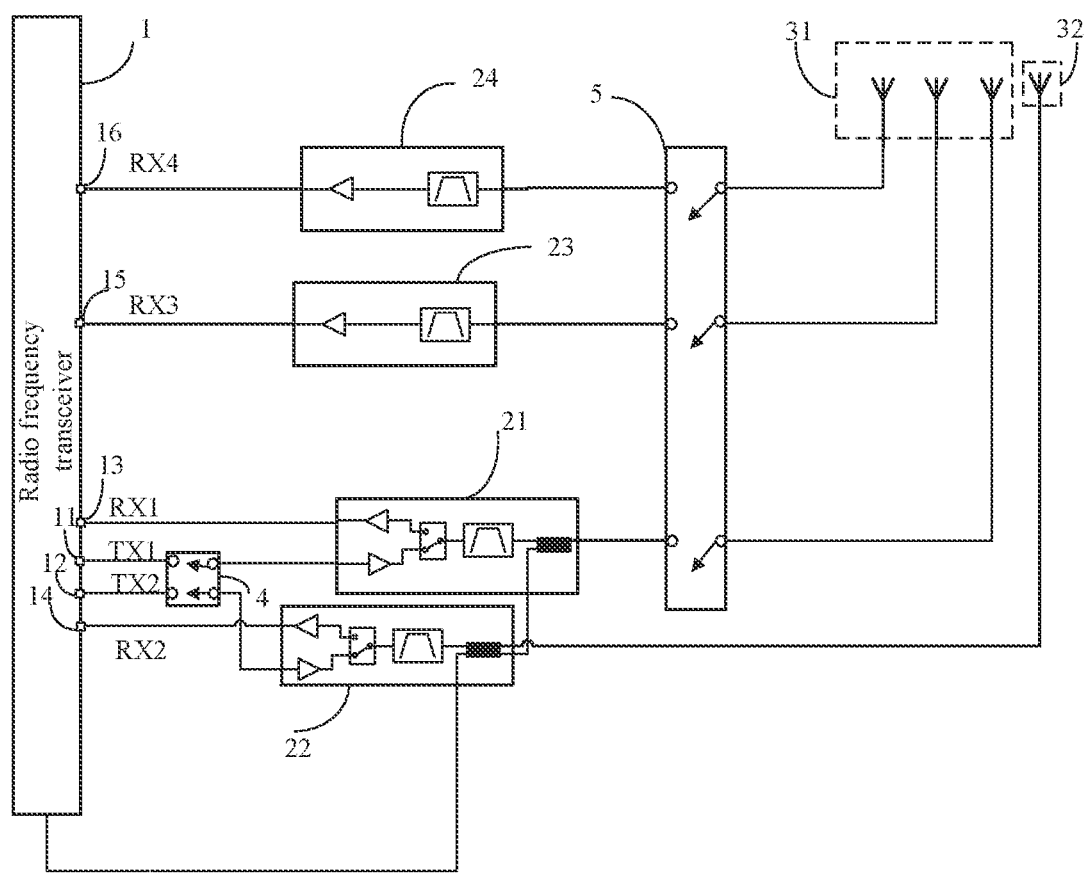
FIG. 1 presents a first schematic diagram of a radio frequency circuit according to an embodiment of the present invention.
Figure 3:
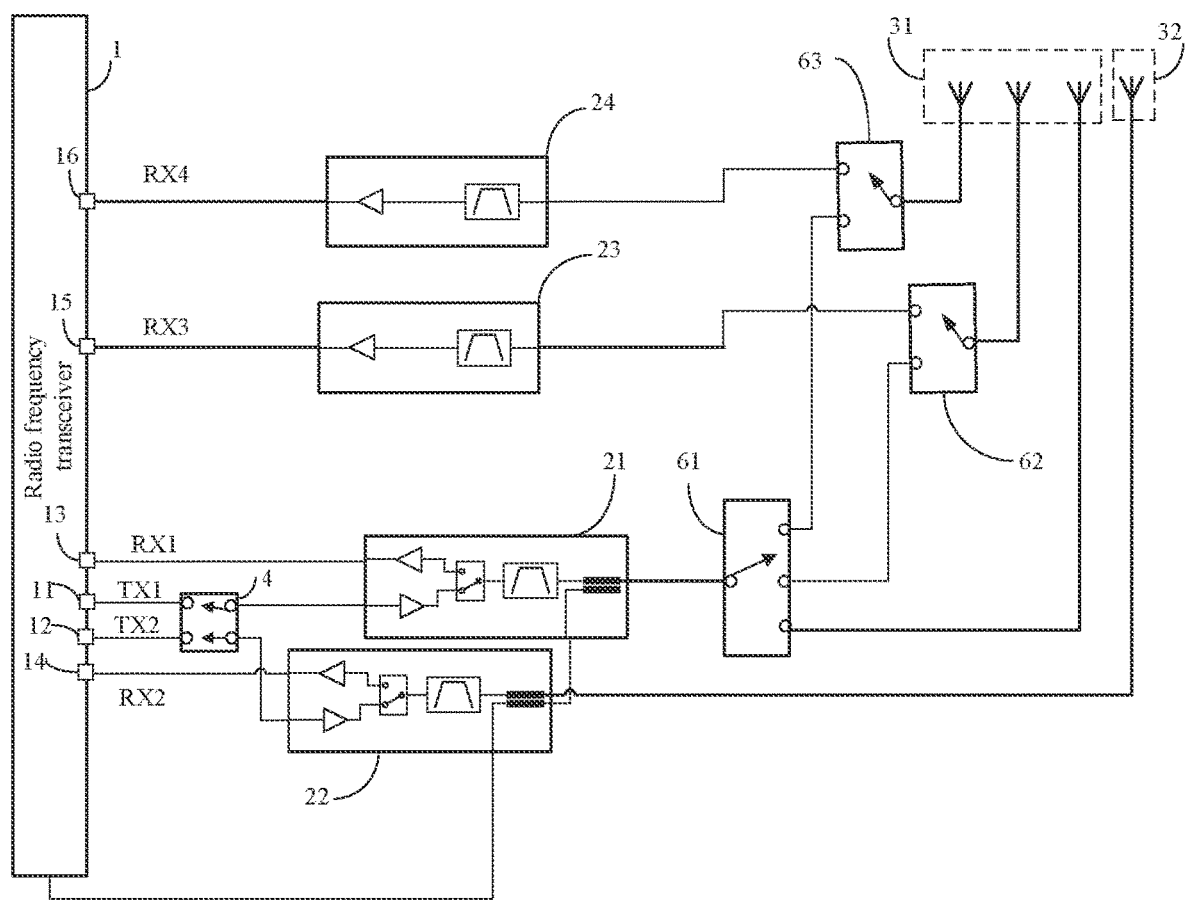
FIG. 3 presents a second schematic diagram of a radio frequency circuit according to an embodiment of the present invention.
Figure 4:
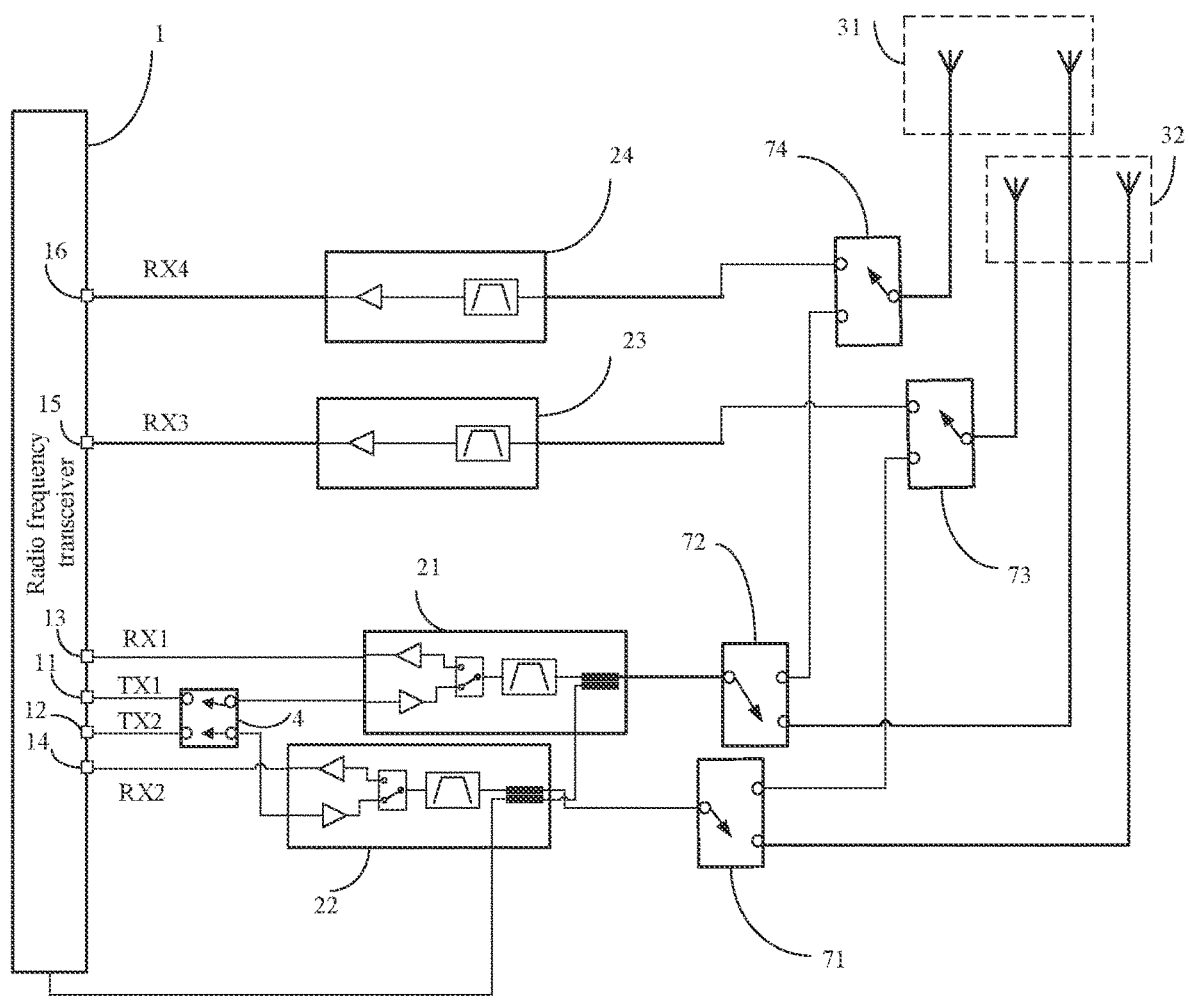
FIG. 4 presents a third schematic diagram of a radio frequency circuit according to an embodiment of the present invention.

An embodiment of the present invention provides a radio frequency circuit, as shown in FIG. 1, FIG. 3, and FIG. 4, including:
 a radio frequency transceiver 1, including a first transmit port 11;
 a first radio frequency module 21, where the first radio frequency module 21 is connected to a first antenna array 31;
 a second radio frequency module 22, where the second radio frequency module 22 is connected to a second antenna array 32; and
 a first switch 4, where a first input terminal of the first switch 4 is connected to the first transmit port 11, and two output terminals of the first switch 4 are respectively connected to the first radio frequency module 21 and the second radio frequency module 22, where
 in a case that the first switch 4 is in a first state, the first transmit port 11 is conductively connected to the first radio frequency module 21; or in a case that the first switch 4 is in a second state, the first transmit port 11 is conductively connected to the second radio frequency module 22.

The radio frequency circuit provided in this embodiment of the present invention includes the radio frequency transceiver 1, the first radio frequency module 21, the second radio frequency module 22, the first antenna array 31, the second antenna array 32, and the first switch 4. The radio frequency transceiver 1 includes the first transmit port 11, and the first transmit port 11 may be denoted as TX1. The first radio frequency module 21 is connected to the first antenna array 31. The first antenna array 31 includes at least one antenna. The second radio frequency module 22 is connected to the second antenna array 32. The second antenna array 32 includes at least one antenna. The first transmit port 11 is located at one end of the first switch 4. The first radio frequency module 21 and the second radio frequency module 22 are located at the other end of the first switch 4.

For the first switch 4, the first switch 4 includes the first input terminal and two output terminals, where the first input terminal is connected to the first transmit port 11, and the two output terminals are respectively connected to the first radio frequency module 21 and the second radio frequency module 22. Specifically, the first input terminal of the first switch 4 is connected to the first transmit port 11, the first output terminal of the first switch 4 is connected to the first radio frequency module 21, and the second output terminal is connected to the second radio frequency module 22. The first input terminal may be conductively connected to the first output terminal. In this case, the first transmit port 11 is connected to the first radio frequency module 21. The first input terminal may also be connected to the second output terminal. In this case, the first transmit port 11 is connected to the second radio frequency module 22.

In the case that the first switch 4 is in the first state, the first input terminal of the first switch 4 is conductively connected to the first output terminal, and the first switch 4 controls the first transmit port 11 to connect to the first radio frequency module 21. In this case, the first transmit port 11 transmits a signal through the first antenna array 31. In the case that the first switch 4 is in the second state, the first input terminal of the first switch 4 is connected to the second output terminal, and the first switch 4 controls the first transmit port 11 to conductively connect to the second radio frequency module 22. In this case, the first transmit port 11 transmits a signal through the second antenna array 32.

In the foregoing circuit structure, the first transmit port may be conductively connected to different radio frequency modules by using the first switch, and switching of antennas can be implemented by selecting different radio frequency modules, thereby reducing a path loss caused by radio frequency wiring, resolving a problem of antenna performance imbalance, and improving antenna switching performance.

Optionally, in an embodiment of the present invention, as shown in FIG. 1, FIG. 3, and FIG. 4, the radio frequency transceiver 1 further includes a second transmit port 12; and a second input terminal of the first switch 4 is connected to the second transmit port 12, where in the case that the first switch 4 is in the first state, the second transmit port 12 is conductively connected to the second radio frequency module 22; or in the case that the first switch 4 is in the second state, the second transmit port 12 is conductively connected to the first radio frequency module 21.

The radio frequency transceiver 1 further includes the second transmit port 12, and the first switch 4 further includes the second input terminal. The second input terminal of the first switch 4 is connected to the second transmit port 12, and the second transmit port 12 may be denoted as TX2. The second input terminal of the first switch 4 may be conductively connected to the first output terminal. In this case, the second transmit port 12 is connected to the first radio frequency module 21. The second input terminal may also be connected to the second output terminal. In this case, the second transmit port 12 is connected to the second radio frequency module 22. The first switch 4 is a two-pole two-throw switch.

In the case that the first switch 4 is in the first state, the second input terminal of the first switch 4 is connected to the second output terminal, and the first switch 4 controls the second transmit port 12 to conductively connect to the second radio frequency module 22. In this case, the second transmit port 12 transmits a signal through the second antenna array 32. In the case that the first switch 4 is in the second state, the second input terminal of the first switch 4 is connected to the first output terminal, and the first switch 4 controls the second transmit port 12 to conductively connect to the first radio frequency module 21. In this case, the second transmit port 12 transmits a signal through the first antenna array 31.

The first transmit port 11 and the second transmit port 12 may work simultaneously or non-simultaneously. When the first transmit port 11 and the second transmit port 12 work simultaneously, the first transmit port 11 and the second transmit port 12 need to transmit signals through different antenna arrays.

When the first transmit port 11 and the second transmit port 12 work simultaneously, the first switch 4 may be in the first state, that is, the first input terminal of the first switch 4 is connected to the first output terminal, and the second input terminal is connected to the second output terminal. In this case, the first transmit port 11 is conductively connected to the first radio frequency module 21, and transmits a signal through the first antenna array 31; and the second transmit port 12 is conductively connected to the second radio frequency module 22, and transmits a signal through the second antenna array 32. Alternatively, the first switch 4 may be in the second state, that is, the first input terminal of the first switch 4 is connected to the second output terminal, and the second input terminal is connected to the first output terminal. In this case, the first transmit port 11 is conductively connected to the second radio frequency module 22, and transmits a signal through the second antenna array 32; and the second transmit port 12 is conductively connected to the first radio frequency module 21, and transmits a signal through the first antenna array 31.

It should be noted that, alternatively, only one of the first transmit port 11 and the second transmit port 12 may work. In a case that the first switch 4 is in a third state, the first transmit port 11 is conductively connected to the first radio frequency module 21 and the second transmit port 12 is disconnected from the second radio frequency module 22. In this case, the first transmit port 11 transmits a signal through the first antenna array 31. In a case that the first switch 4 is in a fourth state, the first transmit port 11 is disconnected from the first radio frequency module 21 and the second transmit port 12 is conductively connected to the second radio frequency module 22. In this case, the second transmit port 12 transmits a signal through the second antenna array 32.

In a case that the first switch 4 is in a fifth state, the first transmit port 11 is conductively connected to the second radio frequency module 22 and the second transmit port 12 is disconnected from the first radio frequency module 21. In this case, the first transmit port 11 transmits a signal through the second antenna array 32. In a case that the first switch 4 is in a sixth state, the first transmit port 11 is disconnected from the second radio frequency module 22 and the second transmit port 12 is conductively connected to the first radio frequency module 21. In this case, the second transmit port 12 transmits a signal through the first antenna array 31.

Optionally, in an embodiment of the present invention, as shown in FIG. 1, FIG. 3, and FIG. 4, the radio frequency circuit further includes a third radio frequency module 23 and a fourth radio frequency module 24, where the radio frequency transceiver 1 further includes a first receive port 13, a second receive port 14, a third receive port 15, and a fourth receive port 16; and the first receive port 13 is connected to the first radio frequency module 21, the second receive port 14 is connected to the second radio frequency module 22, the third receive port 15 is connected to the third radio frequency module 23, and the fourth receive port 16 is connected to the fourth radio frequency module 24, where the first radio frequency module 21 and the second radio frequency module 22 are radio frequency transceiver modules, and the third radio frequency module 23 and the fourth radio frequency module 24 are radio frequency receiving modules.

The radio frequency circuit further includes the third radio frequency module 23 and the fourth radio frequency module 24. The first radio frequency module 21 and the second radio frequency module 22 are radio frequency transceiver modules, and may be configured to transmit and receive radio frequency signals. The third radio frequency module 23 and the fourth radio frequency module 24 are radio frequency receiving modules, and are only configured to receive radio frequency signals.

The radio frequency transceiver 1 further includes the first receive port 13 corresponding to the first transmit port 11, the second receive port 14 corresponding to the second transmit port 12, the third receive port 15, and the fourth receive port 16. The first receive port 13 is connected to the first radio frequency module 21 and configured to receive a radio frequency signal transmitted through the first radio frequency module 21; the second receive port 14 is connected to the second radio frequency module 22 and configured to receive a radio frequency signal transmitted through the second radio frequency module 22; the third receive port 15 is connected to the third radio frequency module 23 and configured to receive a radio frequency signal transmitted through the third radio frequency module 23; and the fourth receive port 16 is connected to the fourth radio frequency module 24 and configured to receive a radio frequency signal transmitted through the fourth radio frequency module 24.

The foregoing structure can implement 1-transmit 4-receive or 2-transmit 4-receive. When only the first transmit port 11 or the second transmit port 12 works, 1-transmit 4-receive can be implemented. In this case, the first transmit port 11 can transmit a signal through the first antenna array 31 or the second antenna array 32, and the second transmit port 12 can transmit a signal through the second antenna array 32 or the first antenna array 31. When the first transmit port 11 and the second transmit port 12 work simultaneously, 2-transmit 4-receive can be implemented. In this case, the first transmit port 11 can transmit a signal through the first antenna array 31, and the second transmit port 12 can transmit a signal through the second antenna array 32; or the first transmit port 11 can transmit a signal through the second antenna array 32, and the second transmit port 12 can transmit a signal through the first antenna array 31.

Optionally, in an embodiment of the present invention, as shown in FIG. 1, the first antenna array 31 includes three antennas, the second antenna array 32 includes one antenna, and the radio frequency circuit further includes a second switch 5;

the second radio frequency module 22 is connected to the antenna in the second antenna array 32; and in signal transmission through the first radio frequency module 21, the first radio frequency module 21 is connected to one of the antennas in the first antenna array 31 by using the second switch 5; in synchronous signal reception, the second switch 5 controls each of the first radio frequency module 21, the third radio frequency module 23, and the fourth radio frequency module 24 to connect to one of the antennas in the first antenna array 31.

With the first switch 4, the first transmit port 11 can transmit a signal through the first radio frequency module 21 or transmit a signal through the second radio frequency module 22. When the first transmit port 11 is conductively connected to the first radio frequency module 21, switching between the three antennas in the first antenna array 31 can be performed by using the second switch 5. When the first transmit port 11 is conductively connected to the second radio frequency module 22, it is possible to switch to the antenna in the second antenna array 32. Therefore, the first transmit port 11 can implement four-antenna switching. Similarly, the second transmit port 12 can also implement four-antenna switching, a process of which is similar to that of the first transmit port 11 and is not described herein.

In signal reception, because the antenna in the second antenna array 32 is connected to the second receive port 14 by using the second radio frequency module 22, the second receive port 14 receives a signal transmitted by the antenna in the second antenna array 32. The second switch 5 can control the first radio frequency module 21 to connect to one antenna in the first antenna array 31, so that the first receive port 13 receives a signal transmitted by the antenna. The second switch 5 can control the third radio frequency module 23 to connect to another antenna in the first antenna array 31, so that the third receive port 15 receives a signal. The second switch 5 can control the fourth radio frequency module 24 to connect to the remaining one antenna in the first antenna array 31, so that the fourth receive port 16 receives a signal.

Optionally, the second switch 5 is a three-pole-three-throw switch; and in signal transmission through the first radio frequency module 21, one throw terminal of the second switch 5 is conductively connected to one common terminal of the second switch 5; in synchronous signal reception through the four antennas, three throw terminals of the second switch 5 are conductively connected to three common terminals of the second switch 5.

The second switch 5 includes three common terminals and three throw terminals. A first throw terminal of the second switch 5 is connected to the first radio frequency module 21, a second throw terminal of the second switch 5 is connected to the third radio frequency module 23, and a third throw terminal of the second switch 5 is connected to the fourth radio frequency module 24. A first common terminal, a second common terminal, and a third common terminal of the second switch 5 are respectively connected to the three antennas in the first antenna array 31. The first throw terminal may be connected to the first common terminal, the second common terminal, or the third common terminal. Correspondingly, the second throw terminal may also be connected to the first common terminal, the second common terminal, or the third common terminal. The third throw terminal may also be connected to the first common terminal, the second common terminal, or the third common terminal.

When the first transmit port 11 or the second transmit port 12 transmits a signal through the first radio frequency module 21, the first throw terminal of the second switch 5 is connected to any common terminal. In signal reception, the three throw terminals may arbitrarily match the three common terminals of the second switch 5, as long as it is ensured that connections are formed between the three throw terminals and the three common terminals.

For example, in the process of signal transmission, when the first throw terminal of the second switch 5 is connected to the second common terminal, the antenna connected to the second common terminal is conductively connected to the first radio frequency module 21, and the first radio frequency module 21 transmits a signal through the antenna connected to the second common terminal. In the process of signal reception, when the first throw terminal of the second switch 5 is connected to the second common terminal, and the second throw terminal is connected to the third common terminal, and the third throw terminal is connected to the first common terminal, the antenna connected to the second common terminal is conductively connected to the first radio frequency module 21, the antenna connected to the third common terminal is conductively connected to the third radio frequency module 23, and the antenna connected to the first common terminal is conductively connected to the fourth radio frequency module 24. Therefore, the first radio frequency module 21 receives a signal from the antenna connected to the second common terminal, the third radio frequency module 23 receives a signal from the antenna connected to the third common terminal, and the fourth radio frequency module 24 receives a signal from the antenna connected to the first common terminal. Other cases of matching between the common terminals and the throw terminals of the second switch 5 are not listed and described herein.

Figure 2:
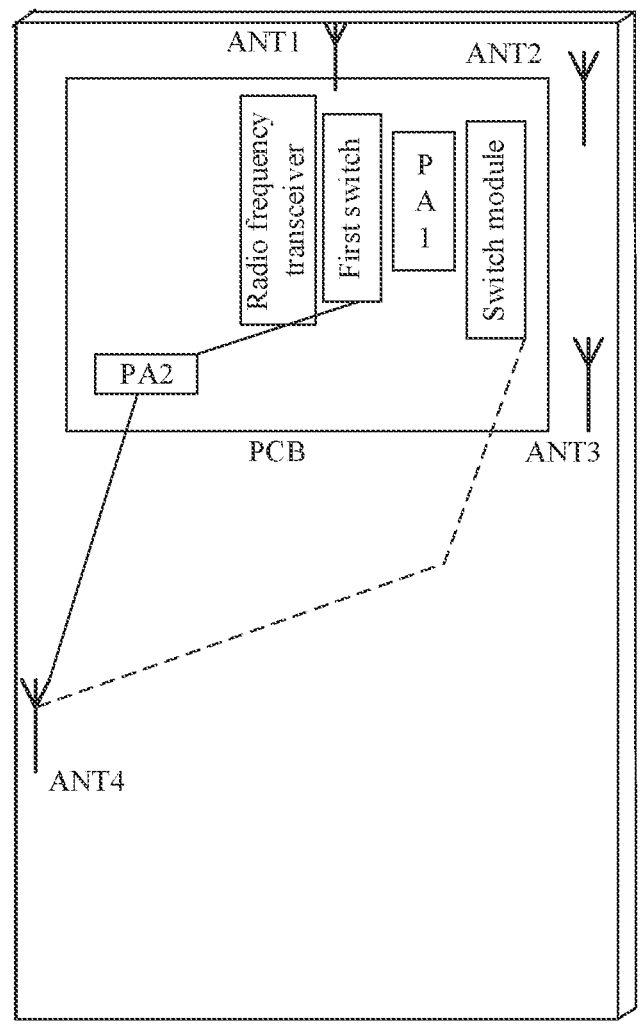
FIG. 2 presents a first comparison diagram of an improved radio frequency wiring path according to an embodiment of the present invention and an existing radio frequency wiring path.

The foregoing structure can resolve an antenna layout problem shown in FIG. 2. In FIG. 2, due to a long distance between an ANT4 (corresponding to the antenna in the second antenna array 32 in FIG. 1) and a radio frequency circuit, an original line (dashed-line part) has a large wiring loss. As a result, performance of signal transmission of the ANT4 is worse than that of other antennas. Using a first switch to directly connect to a PA2 of a second radio frequency module and connect to the ANT4 (solid-line part) can reduce a path loss caused by radio frequency wiring and resolve a problem of antenna performance imbalance, so that antenna switching performance is optimized. In this case, a switch module in FIG. 2 is the second switch in FIG. 1.

Optionally, in an embodiment of the present invention, as shown in FIG. 3, the first antenna array 31 includes a third antenna, a fourth antenna, and a fifth antenna, the second antenna array 32 includes a sixth antenna, and the radio frequency circuit further includes a third switch 61, a fourth switch 62, and a fifth switch 63; the second radio frequency module 22 is connected to the sixth antenna; and an input terminal of the third switch 61 is connected to the first radio frequency module 21, and a plurality of output terminals of the third switch 61 are respectively connected to the third antenna by using the fifth switch 63, connected to the fourth antenna by using the fourth switch 62, and connected to the fifth antenna directly.

With the first switch 4, the first transmit port 11 can transmit a signal through the first radio frequency module 21 or transmit a signal through the second radio frequency module 22. When the first transmit port 11 is conductively connected to the first radio frequency module 21, switching among the third antenna, the fourth antenna, and the fifth antenna can be performed by using the third switch 61, the fourth switch 62, and the fifth switch 63. When the first transmit port 11 is conductively connected to the second radio frequency module 22, it is possible to switch to the sixth antenna. Therefore, the first transmit port 11 can implement four-antenna switching. Similarly, the second transmit port 12 can also implement four-antenna switching, a process of which is similar to that of the first transmit port 11 and is not described herein.

The input terminal of the third switch 61 is connected to the first radio frequency module 21, and the plurality of output terminals of the third switch 61 are respectively connected to the first antenna array 31. When the third switch 61 is connected to the first antenna array 31, the third switch 61 may be directly connected to the fifth antenna, connected to the fourth antenna by using the fourth switch 62, and connected to the third antenna by using the fifth switch 63.

Optionally, the third switch 61 is a single-pole-three-throw switch, and the fourth switch 62 and the fifth switch 63 are single-pole-two-throw switches; a common terminal of the third switch 61 is connected to the first radio frequency module 21, a first throw terminal of the third switch 61 is connected to the fifth antenna, a second throw terminal of the third switch 61 is connected to a first throw terminal of the fourth switch 62, and a third throw terminal of the third switch 61 is connected to a first throw terminal of the fifth switch 63; a second throw terminal of the fourth switch 62 is connected to the third radio frequency module 23, and a common terminal of the fourth switch 62 is connected to the fourth antenna; and a second throw terminal of the fifth switch 63 is connected to the fourth radio frequency module 24, and a common terminal of the fifth switch 63 is connected to the third antenna.

The third switch 61 is a single-pole-three-throw switch, and includes one common terminal and three throw terminals, where the common terminal is connected to the first radio frequency module 21, and the first throw terminal of the third switch 61 is connected to the fifth antenna in the first antenna array 31. The second throw terminal of the third switch 61 is connected to the fourth switch 62. The fourth switch 62 includes one common terminal and two throw terminals. The second throw terminal of the third switch 61 is connected to the first throw terminal of the fourth switch 62. The second throw terminal of the fourth switch 62 is connected to the third radio frequency module 23. The common terminal of the fourth switch 62 is connected to the fourth antenna in the first antenna array 31. The third throw terminal of the third switch 61 is connected to the fifth switch 63. The fifth switch 63 includes one common terminal and two throw terminals. The third throw terminal of the third switch 61 is connected to the first throw terminal of the fifth switch 63. The second throw terminal of the fifth switch 63 is connected to the fourth radio frequency module 24. The common terminal of the fifth switch 63 is connected to the third antenna in the first antenna array 31.

When the common terminal of the fourth switch 62 is connected to the first throw terminal, the fourth antenna connected to the common terminal of the fourth switch 62 can be connected to the second throw terminal of the third switch 61. When the second throw terminal of the third switch 61 is connected to the common terminal, the fourth antenna connected to the fourth switch 62 is conductively connected to the first radio frequency module 21. When the common terminal of the fourth switch 62 is connected to the second throw terminal, the fourth antenna connected to the fourth switch 62 is conductively connected to the third radio frequency module 23.

When the common terminal of the fifth switch 63 is connected to the first throw terminal, the third antenna connected to the common terminal of the fifth switch 63 can be connected to the third throw terminal of the third switch 61. When the third throw terminal of the third switch 61 is connected to the common terminal, the third antenna connected to the fifth switch 63 is conductively connected to the first radio frequency module 21. When the common terminal of the fifth switch 63 is connected to the second throw terminal, the third antenna connected to the fifth switch 63 is conductively connected to the fourth radio frequency module 24. When the first throw terminal of the third switch 61 is connected to the common terminal, the fifth antenna directly connected to the third switch 61 is conductively connected to the first radio frequency module 21.

Optionally, in signal transmission through the first radio frequency module 21, the first radio frequency module 21 is connected to the fifth antenna by using the third switch 61, or the first radio frequency module 21 is connected to the fourth antenna by using the third switch 61 and the fourth switch 62, or the first radio frequency module 21 is connected to the third antenna by using the third switch 61 and the fifth switch 63; or in synchronous signal reception through the four antennas, the first radio frequency module 21 is connected to the fifth antenna by using the third switch 61, the second radio frequency module 22 is connected to the sixth antenna, the third radio frequency module 23 is connected to the fourth antenna by using the fourth switch 62, and the fourth radio frequency module 24 is connected to the third antenna by using the fifth switch 63.

Because the second radio frequency module 22 is directly connected to the sixth antenna in the second antenna array 32, in signal transmission through the second radio frequency module 22, a signal can be transmitted directly through the sixth antenna. In signal transmission through the first radio frequency module 21, the third switch 61 can conductively connect the first radio frequency module 21 to the fifth antenna directly connected to the third switch 61, so that the first transmit port 11 or the second transmit port 12 transmits a signal through the fifth antenna directly connected to the third switch 61; the third switch 61 can further conductively connect the first radio frequency module 21 to the first throw terminal of the fourth switch 62, and when the common terminal of the fourth switch 62 is conductively connected to the first throw terminal, the fourth antenna connected to the fourth switch 62 is conductively connected to the first radio frequency module 21, and in this case, the first transmit port 11 or the second transmit port 12 transmits a signal through the fourth antenna connected to the fourth switch 62; and the third switch 61 can further conductively connect the first radio frequency module 21 to the first throw terminal of the fifth switch 63, and when the common terminal of the fifth switch 63 is conductively connected to the first throw terminal, the third antenna connected to the fifth switch 63 is conductively connected to the first radio frequency module 21, and in this case, the first transmit port 11 or the second transmit port 12 transmits a signal through the third antenna connected to the fifth switch 63.

In synchronous signal reception, because the second radio frequency module 22 is directly connected to the sixth antenna in the second antenna array 32, the second radio frequency module 22 may directly receive a signal from the sixth antenna. For the first antenna array 31, the first radio frequency module 21 is connected to the fifth antenna in the first antenna array 31 by using the third switch 61. Specifically, the common terminal of the third switch 61 is conductively connected to the first throw terminal, and the first radio frequency module 21 receives a signal from the fifth antenna directly connected to the third switch 61. The third radio frequency module 23 is connected to the fourth antenna in the first antenna array 31 by using the fourth switch 62. Specifically, the common terminal of the fourth switch 62 is conductively connected to the second throw terminal, and the third radio frequency module 23 receives a signal from the fourth antenna connected to the fourth switch 62. The fourth radio frequency module 24 is connected to the third antenna in the first antenna array 31 by using the fifth switch 63. Specifically, the common terminal of the fifth switch 63 is conductively connected to the second throw terminal, and the fourth radio frequency module 24 receives a signal from the third antenna connected to the fifth switch 63.

The foregoing structure can also resolve the antenna layout problem shown in FIG. 2. In FIG. 2, due to the long distance between the ANT4 (corresponding to the sixth antenna in the second antenna array 32 in FIG. 3) and the radio frequency circuit, the original line (dashed-line part) has a large wiring loss. As a result, performance of signal transmission of the ANT4 is worse than that of other antennas. Using the first switch to directly connect to the PA2 of the second radio frequency module and connect to the ANT4 (solid-line part) can reduce a path loss caused by radio frequency wiring and resolve the problem of antenna performance imbalance, so that the antenna switching performance is optimized. In this case, the switch module in FIG. 2 is the third switch 61, the fourth switch 62, and the fifth switch 63 in FIG. 3.

Optionally, in an embodiment of the present invention, as shown in FIG. 4, the first antenna array 31 includes a seventh antenna and an eighth antenna, the second antenna array 32 includes a ninth antenna and a tenth antenna, and the radio frequency circuit further includes a sixth switch 71, a seventh switch 72, an eighth switch 73, and a ninth switch 74;

an input terminal of the sixth switch 71 is connected to the second radio frequency module 22, and two output terminals of the sixth switch 71 are respectively connected to the ninth antenna by using the eighth switch 73 and connected to the tenth antenna directly; and an input terminal of the seventh switch 72 is connected to the first radio frequency module 21, and two output terminals of the seventh switch 72 are respectively connected to the seventh antenna by using the ninth switch 74 and connected to the eighth antenna directly.

With the first switch 4, the first transmit port 11 can transmit a signal through the first radio frequency module 21 or transmit a signal through the second radio frequency module 22; and correspondingly, the second transmit port 12 can transmit a signal through the first radio frequency module 21 or transmit a signal through the second radio frequency module 22.

The first antenna array 31 includes the seventh antenna and the eighth antenna. The second antenna array 32 includes the ninth antenna and the tenth antenna. The radio frequency circuit further includes the sixth switch 71, the seventh switch 72, the eighth switch 73, and the ninth switch 74. The first radio frequency module 21 can be connected to the eighth antenna in the first antenna array 31 by using the seventh switch 72, and can be connected to the seventh antenna in the first antenna array 31 by using the seventh switch 72 and the ninth switch 74. The second radio frequency module 22 can be connected to the tenth antenna in the second antenna array 32 by using the sixth switch 71, and can be connected to the ninth antenna in the second antenna array 32 by using the sixth switch 71 and the eighth switch 73.

Optionally, the sixth switch 71, the seventh switch 72, the eighth switch 73, and the ninth switch 74 are all single-pole-two-throw switches;

a common terminal of the sixth switch 71 is connected to the second radio frequency module 22, a first throw terminal of the sixth switch 71 is connected to the tenth antenna, a second throw terminal of the sixth switch 71 is connected to a first throw terminal of the eighth switch 73, a second throw terminal of the eighth switch 73 is connected to the third radio frequency module 23, and a common terminal of the eighth switch 73 is connected to the ninth antenna; and a common terminal of the seventh switch 72 is connected to the first radio frequency module 21, a first throw terminal of the seventh switch 72 is connected to the eighth antenna, a second throw terminal of the seventh switch 72 is connected to a first throw terminal of the ninth switch 74, a second throw terminal of the ninth switch 74 is connected to the fourth radio frequency module 24, and a common terminal of the ninth switch 74 is connected to the seventh antenna.

When the first transmit port 11 is conductively connected to the first radio frequency module 21, the first transmit port 11 can be connected to the eighth antenna in the first antenna array 31 by using the seventh switch 72, or connected to the first throw terminal of the ninth switch 74. Because the ninth switch 74 is connected to the seventh antenna in the first antenna array 31, the first radio frequency module 21 can switch between the eighth antenna and the seventh antenna. When the second transmit port 12 is conductively connected to the first radio frequency module 21, the first radio frequency module 21 can also switch between the eighth antenna and the seventh antenna. When the first transmit port 11 is conductively connected to the second radio frequency module 22, the first transmit port 11 can be connected to the tenth antenna in the second antenna array 32 by using the sixth switch 71, or connected to the first throw terminal of the eighth switch 73. Because the eighth switch 73 is connected to the ninth antenna in the second antenna array 32, the second radio frequency module 22 can switch between the ninth antenna and the tenth antenna. When the second transmit port 12 is conductively connected to the second radio frequency module 22, the second radio frequency module 22 can also switch between the ninth antenna and the tenth antenna.

The sixth switch 71 includes one common terminal and two throw terminals. The common terminal of the sixth switch 71 is connected to the second radio frequency module 22, the first throw terminal of the sixth switch 71 is connected to the tenth antenna, and the second throw terminal of the sixth switch 71 is connected to the first throw terminal of the eighth switch 73. The eighth switch 73 further includes the second throw terminal and one common terminal. The second throw terminal of the eighth switch 73 is connected to the third radio frequency module 23, and the common terminal of the eighth switch 73 is connected to the ninth antenna. When the common terminal of the eighth switch 73 is connected to the first throw terminal, the ninth antenna connected to the eighth switch 73 is conductively connected to the second throw terminal of the sixth switch 71. When the second throw terminal of the sixth switch 71 is connected to the common terminal, the ninth antenna connected to the eighth switch 73 can be conductively connected to the second radio frequency module 22. When the common terminal of the eighth switch 73 is connected to the second throw terminal, the ninth antenna connected to the eighth switch 73 is conductively connected to the third radio frequency module 23.

The seventh switch 72 includes one common terminal and two throw terminals. The common terminal of the seventh switch 72 is connected to the first radio frequency module 21, the first throw terminal of the seventh switch 72 is connected to the eighth antenna, and the second throw terminal of the seventh switch 72 is connected to the first throw terminal of the ninth switch 74. The ninth switch 74 further includes the second throw terminal and one common terminal. The second throw terminal of the ninth switch 74 is connected to the fourth radio frequency module 24, and the common terminal of the ninth switch 74 is connected to the seventh antenna. When the common terminal of the ninth switch 74 is connected to the first throw terminal, the seventh antenna connected to the ninth switch 74 is conductively connected to the second throw terminal of the seventh switch 72. When the second throw terminal of the seventh switch 72 is connected to the common terminal, the seventh antenna connected to the ninth switch 74 can be conductively connected to the first radio frequency module 21. When the common terminal of the ninth switch 74 is connected to the second throw terminal, the seventh antenna connected to the ninth switch 74 is conductively connected to the fourth radio frequency module 24.

Optionally, in signal transmission through the second radio frequency module 22, the second radio frequency module 22 is connected to the tenth antenna by using the sixth switch 71, or the second radio frequency module 22 is connected to the ninth antenna by using the sixth switch 71 and the eighth switch 73; and/or in signal transmission through the first radio frequency module 21, the first radio frequency module 21 is connected to the eighth antenna by using the seventh switch 72, or the first radio frequency module 21 is connected to the seventh antenna by using the seventh switch 72 and the ninth switch 74.

In signal transmission through the second radio frequency module 22, the sixth switch 71 can conductively connect the second radio frequency module 22 to the tenth antenna, so that the first transmit port 11 or the second transmit port 12 transmits a signal through the tenth antenna; or the sixth switch 71 can conductively connect the second radio frequency module 22 to the first throw terminal of the eighth switch 73, so that when the ninth antenna is conductively connected to the first throw terminal of the eighth switch 73, the first transmit port 11 or the second transmit port 12 transmits a signal through the ninth antenna.

In signal transmission through the first radio frequency module 21, the seventh switch 72 can conductively connect the first radio frequency module 21 to the eighth antenna, so that the first transmit port 11 or the second transmit port 12 transmits a signal through the eighth antenna; or the seventh switch 72 can conductively connect the first radio frequency module 21 to the first throw terminal of the ninth switch 74, so that when the seventh antenna is conductively connected to the first throw terminal of the ninth switch 74, the first transmit port 11 or the second transmit port 12 transmits a signal through the seventh antenna.

The second radio frequency module 22 and the first radio frequency module 21 can transmit signals simultaneously. In this case, the second radio frequency module 22 transmits a signal through the second antenna array 32, and the first radio frequency module 21 transmits a signal through the first antenna array 31. Alternatively, one of the second radio frequency module 22 and the first radio frequency module 21 may transmit a signal.

Optionally, in synchronous signal reception through the four antennas, the first radio frequency module 21 is connected to the eighth antenna by using the seventh switch 72, the second radio frequency module 22 is connected to the tenth antenna by using the sixth switch 71, the third radio frequency module 23 is connected to the ninth antenna by using the eighth switch 73, and the fourth radio frequency module 24 is connected to the seventh antenna by using the ninth switch 74.

In synchronous signal reception, the first throw terminal of the sixth switch 71 is connected to the common terminal, so that the tenth antenna is connected to the second radio frequency module 22; the first throw terminal of the seventh switch 72 is connected to the common terminal, so that the eighth antenna is connected to the first radio frequency module 21; the second throw terminal of the eighth switch 73 is connected to the common terminal, so that the ninth antenna is connected to the third radio frequency module 23; and the second throw terminal of the ninth switch 74 is connected to the common terminal, so that the seventh antenna is connected to the fourth radio frequency module 24.

Figure 5:
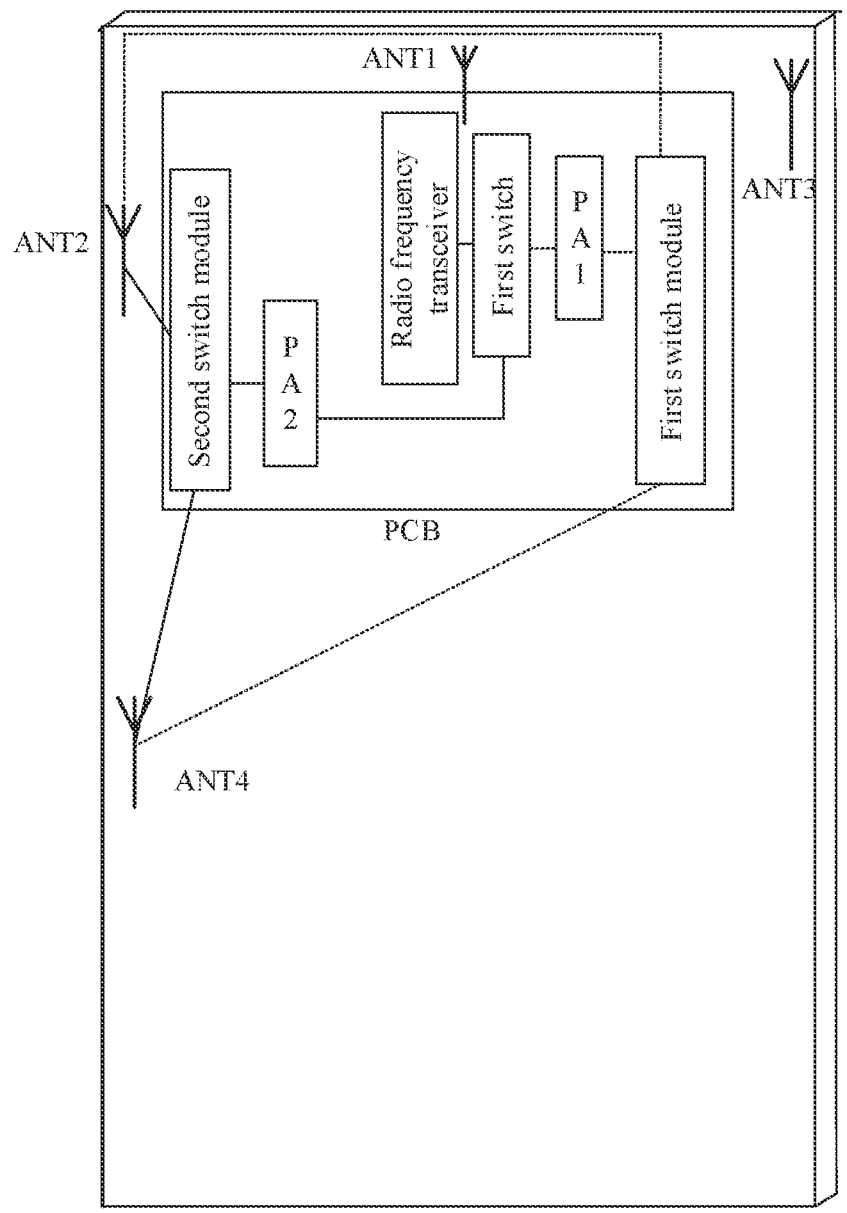
FIG. 5 presents a second comparison diagram of an improved radio frequency wiring path according to an embodiment of the present invention and an existing radio frequency wiring path.

The foregoing structure can resolve an antenna layout problem shown in FIG. 5. In FIG. 5, because an ANT4 (corresponding to the tenth antenna in FIG. 4) and an ANT2 (corresponding to the ninth antenna in FIG. 4) are far away from a radio frequency circuit, the radio frequency circuit is disposed on a printed circuit board (Printed Circuit Board, PCB) board, and an original line (dashed-line part) has a large wiring loss. As a result, performance of signal transmission of the ANT4 and the ANT2 is worse than that of other antennas. Using a first switch to directly connect to a PA2 of a second radio frequency module and using a second switch module to connect to the ANT2 and the ANT4 (solid-line part) can reduce a path loss caused by radio frequency wiring and resolve a problem of antenna performance imbalance, so that antenna switching performance is optimized. In this case, a first switch module in FIG. 5 is the seventh switch 72 and the ninth switch 74 in FIG. 4, and the second switch module is the sixth switch 71 and the eighth switch 73 in FIG. 4.

Optionally, in an embodiment of the present invention, as shown in FIG. 1, FIG. 3, and FIG. 4, the first transmit port 11 may be conductively connected to the first radio frequency module 21 or the second radio frequency module 22. When the first transmit port 11 is conductively connected to the first radio frequency module 21, the first transmit port 11 may transmit a first radio frequency signal through the first antenna array 31. When the first transmit port 11 is conductively connected to the second radio frequency module 22, the first transmit port 11 may transmit a first radio frequency signal through the second antenna array 32.

The second transmit port 12 may be conductively connected to the first radio frequency module 21 or the second radio frequency module 22. When the second transmit port 12 is conductively connected to the first radio frequency module 21, the second transmit port 12 may transmit a second radio frequency signal through the first antenna array 31. When the second transmit port 12 is conductively connected to the second radio frequency module 21, the second transmit port 12 may transmit a second radio frequency signal through the second antenna array 32.

The first transmit port 11 and the second transmit port 12 can also transmit signals simultaneously. In this case, the first transmit port 11 transmits a signal through the first antenna array 31, and the second transmit port 12 transmits a signal through the second antenna array 32; or the first transmit port 11 transmits a signal through the second antenna array 32, and the second transmit port 12 transmits a signal through the first antenna array 31.

An embodiment of the present invention further provides an electronic device, including the foregoing radio frequency circuit. By using the foregoing radio frequency circuit in different antenna layouts, the first transmit port and/or the second transmit port can be controlled to conductively connect to different radio frequency modules, and it is possible to select different radio frequency modules to implement antenna switching, reduce a path loss caused by radio frequency wiring, further resolve a problem of antenna performance imbalance, and improve antenna switching performance.

All embodiments in this specification are described in a progressive manner. Each embodiment focuses on differences from other embodiments. For the part that is the same or similar between different embodiments, reference may be made between the embodiments.

Although some preferred embodiments in the embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the embodiments of the present invention.

Finally, it should be noted that in this specification, relational terms such as first and second are used only to differentiate an entity or operation from another entity or operation, and do not necessarily require or imply that any actual relationship or sequence exists between these entities or operations. Moreover, the terms "comprise", "include", or any of their variants are intended to cover a non-exclusive inclusion, so that a process, a method, an article, or terminal device that includes a list of elements not only includes those elements but also includes other elements that are not expressly listed, or further includes elements inherent to such a process, method, article, or terminal device. In absence of more constraints, an element preceded by "includes a . . . " does not preclude existence of other identical elements in the process, method, article, or terminal device that includes the element.

The foregoing descriptions are preferred implementations of the present invention. It should be noted that a person of ordinary skill in the art may make several improvements or refinements without departing from the principle of the present invention and the improvements or refinements shall fall within the protection scope of the present invention.

What is claimed is:
1. A radio frequency circuit, comprising:
 a radio frequency transceiver, comprising a first transmit port;
 a first radio frequency sub-circuit, wherein the first radio frequency sub-circuit is connected to a first antenna array;

a second radio frequency sub-circuit, wherein the second radio frequency sub-circuit is connected to a second antenna array; and a first switch, wherein a first input terminal of the first switch is connected to the first transmit port, and two output terminals of the first switch are respectively connected to the first radio frequency sub-circuit and the second radio frequency sub-circuit, wherein in a case that the first switch is in a first state, the first transmit port is conductively connected to the first radio frequency sub-circuit; or in a case that the first switch is in a second state, the first transmit port is conductively connected to the second radio frequency sub-circuit;

wherein the radio frequency transceiver further comprises a second transmit port; and a second input terminal of the first switch is connected to the second transmit port, wherein in the case that the first switch is in the first state, the second transmit port is conductively connected to the second radio frequency sub-circuit; or in the case that the first switch is in the second state, the second transmit port is conductively connected to the first radio frequency sub-circuit;

a third radio frequency sub-circuit and a fourth radio frequency sub-circuit, wherein the radio frequency transceiver further comprises a first receive port, a second receive port, a third receive port, and a fourth receive port; and the first receive port is connected to the first radio frequency sub-circuit, the second receive port is connected to the second radio frequency sub-circuit, the third receive port is connected to the third radio frequency sub-circuit, and the fourth receive port is connected to the fourth radio frequency sub-circuit, wherein the first radio frequency sub-circuit and the second radio frequency sub-circuit are radio frequency transceiver sub-circuits, and the third radio frequency sub-circuit and the fourth radio frequency sub-circuit are radio frequency receiving sub-circuits;

wherein the first antenna array comprises three antennas, the second antenna array comprises one antenna, and the radio frequency circuit further comprises a second switch;

the second radio frequency sub-circuit is connected to the antenna in the second antenna array; and in signal transmission through the first radio frequency sub-circuit, the first radio frequency sub-circuit is connected to one of the antennas in the first antenna array by using the second switch; in synchronous signal reception, the second switch controls each of the first radio frequency sub-circuit, the third radio frequency sub-circuit, and the fourth radio frequency sub-circuit to connect to one of the antennas in the first antenna array; or, wherein the first antenna array comprises a third antenna, a fourth antenna, and a fifth antenna, the second antenna array comprises a sixth antenna, and the radio frequency circuit further comprises a third switch, a fourth switch, and a fifth switch;

the second radio frequency sub-circuit is connected to the sixth antenna; and an input terminal of the third switch is connected to the first radio frequency sub-circuit, and a plurality of output terminals of the third switch are respectively connected to the third antenna by using the fifth switch, connected to the fourth antenna by using the fourth switch, and connected to the fifth antenna directly; or, wherein the first antenna array comprises a seventh antenna and an eighth antenna, the second antenna array comprises a ninth antenna and a tenth antenna, and the radio frequency circuit further comprises a sixth switch, a seventh switch, an eighth switch, and a ninth switch;

an input terminal of the sixth switch is connected to the second radio frequency sub-circuit, and two output terminals of the sixth switch are respectively connected to the ninth antenna by using the eighth switch and connected to the tenth antenna directly; and an input terminal of the seventh switch is connected to the first radio frequency sub-circuit, and two output terminals of the seventh switch are respectively connected to the seventh antenna by using the ninth switch and connected to the eighth antenna directly.

2. The radio frequency circuit according to claim 1, wherein the second switch is a three-pole-three-throw switch; and in signal transmission through the first radio frequency sub-circuit, one throw terminal of the second switch is conductively connected to one common terminal of the second switch; or in synchronous signal reception through the four antennas, three throw terminals of the second switch are conductively connected to three common terminals of the second switch.

3. The radio frequency circuit according to claim 1, wherein the third switch is a single-pole-three-throw switch, and the fourth switch and the fifth switch are single-pole-two-throw switches;

a common terminal of the third switch is connected to the first radio frequency sub-circuit, a first throw terminal of the third switch is connected to the fifth antenna, a second throw terminal of the third switch is connected to a first throw terminal of the fourth switch, and a third throw terminal of the third switch is connected to a first throw terminal of the fifth switch;

a second throw terminal of the fourth switch is connected to the third radio frequency sub-circuit, and a common terminal of the fourth switch is connected to the fourth antenna; and a second throw terminal of the fifth switch is connected to the fourth radio frequency sub-circuit, and a common terminal of the fifth switch is connected to the third antenna.

4. The radio frequency circuit according to claim 3, wherein in signal transmission through the first radio frequency sub-circuit, the first radio frequency sub-circuit is connected to the fifth antenna by using the third switch, or the first radio frequency sub-circuit is connected to the fourth antenna by using the third switch and the fourth switch, or the first radio frequency sub-circuit is connected to the third antenna by using the third switch and the fifth switch; or in synchronous signal reception through the four antennas, the first radio frequency sub-circuit is connected to the fifth antenna by using the third switch, the second radio frequency sub-circuit is connected to the sixth antenna, the third radio frequency sub-circuit is connected to the fourth antenna by using the fourth switch, and the fourth radio frequency sub-circuit is connected to the third antenna by using the fifth switch.

5. The radio frequency circuit according to claim 1, wherein
the sixth switch, the seventh switch, the eighth switch, and the ninth switch are all single-pole-two-throw switches;
a common terminal of the sixth switch is connected to the second radio frequency sub-circuit, a first throw terminal of the sixth switch is connected to the tenth antenna, a second throw terminal of the sixth switch is connected to a first throw terminal of the eighth switch, a second throw terminal of the eighth switch is connected to the third radio frequency sub-circuit, and a common terminal of the eighth switch is connected to the ninth antenna; and
a common terminal of the seventh switch is connected to the first radio frequency sub-circuit, a first throw terminal of the seventh switch is connected to the eighth antenna, a second throw terminal of the seventh switch is connected to a first throw terminal of the ninth switch, a second throw terminal of the ninth switch is connected to the fourth radio frequency sub-circuit, and a common terminal of the ninth switch is connected to the seventh antenna.

6. The radio frequency circuit according to claim 5, wherein
in signal transmission through the second radio frequency sub-circuit, the second radio frequency sub-circuit is connected to the tenth antenna by using the sixth switch, or the second radio frequency sub-circuit is connected to the ninth antenna by using the sixth switch and the eighth switch; and/or
in signal transmission through the first radio frequency sub-circuit, the first radio frequency sub-circuit is connected to the eighth antenna by using the seventh switch, or the first radio frequency sub-circuit is connected to the seventh antenna by using the seventh switch and the ninth switch.

7. The radio frequency circuit according to claim 5, wherein
in synchronous signal reception through the four antennas, the first radio frequency sub-circuit is connected to the eighth antenna by using the seventh switch, the second radio frequency sub-circuit is connected to the tenth antenna by using the sixth switch, the third radio frequency sub-circuit is connected to the ninth antenna by using the eighth switch, and the fourth radio frequency module is connected to the seventh antenna by using the ninth switch.

8. An electronic device, wherein the electronic device comprises a radio frequency circuit, the radio frequency circuit comprises:
a radio frequency transceiver, comprising a first transmit port;
a first radio frequency sub-circuit, wherein the first radio frequency sub-circuit is connected to a first antenna array;
a second radio frequency sub-circuit, wherein the second radio frequency sub-circuit is connected to a second antenna array; and
a first switch, wherein a first input terminal of the first switch is connected to the first transmit port, and two output terminals of the first switch are respectively connected to the first radio frequency sub-circuit and the second radio frequency sub-circuit, wherein
in a case that the first switch is in a first state, the first transmit port is conductively connected to the first radio frequency sub-circuit; or in a case that the first switch is in a second state, the first transmit port is conductively connected to the second radio frequency sub-circuit;
wherein the radio frequency transceiver further comprises a second transmit port; and
a second input terminal of the first switch is connected to the second transmit port, wherein
in the case that the first switch is in the first state, the second transmit port is conductively connected to the second radio frequency sub-circuit; or in the case that the first switch is in the second state, the second transmit port is conductively connected to the first radio frequency sub-circuit;
a third radio frequency sub-circuit and a fourth radio frequency sub-circuit, wherein
the radio frequency transceiver further comprises a first receive port, a second receive port, a third receive port, and a fourth receive port; and
the first receive port is connected to the first radio frequency sub-circuit, the second receive port is connected to the second radio frequency sub-circuit, the third receive port is connected to the third radio frequency sub-circuit, and the fourth receive port is connected to the fourth radio frequency sub-circuit, wherein
the first radio frequency sub-circuit and the second radio frequency sub-circuit are radio frequency transceiver sub-circuits, and the third radio frequency sub-circuit and the fourth radio frequency sub-circuit are radio frequency receiving sub-circuits;
wherein the first antenna array comprises three antennas, the second antenna array comprises one antenna, and the radio frequency circuit further comprises a second switch;
the second radio frequency sub-circuit is connected to the antenna in the second antenna array; and
in signal transmission through the first radio frequency sub-circuit, the first radio frequency sub-circuit is connected to one of the antennas in the first antenna array by using the second switch; in synchronous signal reception, the second switch controls each of the first radio frequency sub-circuit, the third radio frequency sub-circuit, and the fourth radio frequency sub-circuit to connect to one of the antennas in the first antenna array; or,
wherein the first antenna array comprises a third antenna, a fourth antenna, and a fifth antenna, the second antenna array comprises a sixth antenna, and the radio frequency circuit further comprises a third switch, a fourth switch, and a fifth switch;
the second radio frequency sub-circuit is connected to the sixth antenna; and
an input terminal of the third switch is connected to the first radio frequency sub-circuit, and a plurality of output terminals of the third switch are respectively connected to the third antenna by using the fifth switch, connected to the fourth antenna by using the fourth switch, and connected to the fifth antenna directly; or,
wherein the first antenna array comprises a seventh antenna and an eighth antenna, the second antenna array comprises a ninth antenna and a tenth antenna, and the radio frequency circuit further comprises a sixth switch, a seventh switch, an eighth switch, and a ninth switch;
an input terminal of the sixth switch is connected to the second radio frequency sub-circuit, and two output terminals of the sixth switch are respectively connected to the ninth antenna by using the eighth switch and connected to the tenth antenna directly; and an input terminal of the seventh switch is connected to the first radio frequency sub-circuit, and two output terminals of the seventh switch are respectively connected to the seventh antenna by using the ninth switch and connected to the eighth antenna directly.

9. The electronic device according to claim 8, wherein the second switch is a three-pole-three-throw switch; and in signal transmission through the first radio frequency sub-circuit, one throw terminal of the second switch is conductively connected to one common terminal of the second switch; or in synchronous signal reception through the four antennas, three throw terminals of the second switch are conductively connected to three common terminals of the second switch.

10. The electronic device according to claim 8, wherein the third switch is a single-pole-three-throw switch, and the fourth switch and the fifth switch are single-pole-two-throw switches;

a common terminal of the third switch is connected to the first radio frequency sub-circuit, a first throw terminal of the third switch is connected to the fifth antenna, a second throw terminal of the third switch is connected to a first throw terminal of the fourth switch, and a third throw terminal of the third switch is connected to a first throw terminal of the fifth switch;

a second throw terminal of the fourth switch is connected to the third radio frequency sub-circuit, and a common terminal of the fourth switch is connected to the fourth antenna; and a second throw terminal of the fifth switch is connected to the fourth radio frequency sub-circuit, and a common terminal of the fifth switch is connected to the third antenna.

11. The electronic device according to claim 10, wherein in signal transmission through the first radio frequency sub-circuit, the first radio frequency sub-circuit is connected to the fifth antenna by using the third switch, or the first radio frequency sub-circuit is connected to the fourth antenna by using the third switch and the fourth switch, or the first radio frequency sub-circuit is connected to the third antenna by using the third switch and the fifth switch; or in synchronous signal reception through the four antennas, the first radio frequency sub-circuit is connected to the fifth antenna by using the third switch, the second radio frequency sub-circuit is connected to the sixth antenna, the third radio frequency sub-circuit is connected to the fourth antenna by using the fourth switch, and the fourth radio frequency sub-circuit is connected to the third antenna by using the fifth switch.

* * * * *